United States Patent Office 3,034,858
Patented May 15, 1962

3,034,858
PRODUCTION OF NON-CAKING FERTILIZERS
Van C. Vives, Bartlesville, Okla., assignor to Phillips Petroleum Company, a corporation of Delaware
No Drawing. Filed Jan. 27, 1958, Ser. No. 711,140
9 Claims. (Cl. 23—103)

This invention relates to the production of non-caking fertilizers. In one aspect it relates to the production of a free-flowing fertilizer which exhibits little or no tendency to cake on standing. In another aspect it relates to a method for improving the storage stability of simple or mixed fertilizers. In a further aspect it relates to solid fertilizer materials, such as ammonium nitrate, treated with a novel conditioning agent and having a reduced tendency to cake.

While I propose by the practice of this invention to improve the storage stability of those fertilizer materials which normally tend to cake on standing, my invention is particularly applicable to improving the storage stability of ammonium nitrate per se and ammonium nitrate-containing, mixed fertilizers and the invention will be discussed as applied thereto. However, it is to be understood that I do not intend to limit my invention thereto but rather broadly intend by the practice of this invention to improve the storage stability of both simple and mixed commercially prepared fertilizers which normally tend to cake or set.

One of the requirements of any fertilizer is that it must be in condition to be distributed satisfactorily from a fertilizer distributor. Many commercially prepared fertilizers tend to cake or become sticky either during storage, shipping, or after they are received by the customer. This condition greatly impairs the drillability of the fertilizer and increases the cost of its uniform distribution in the field. This condition can be partially relieved by producing the fertilizer material in the form of granules, by storing and shipping the fertilizer in moisture-proof containers, and by the use of various water-proofing or conditioning agents.

Different fertilizer materials cake for different reasons, but the primary cause of caking is usually the presence of moisture which induces a caked condition. Ammonium nitrate is hydroscopic and can undergo certain phase changes, one of which is normally encountered in the ambient temperature range in which ammonium nitrate is stored; these properties tend to cause the fertilizer to cake.

Ammonium nitrate has enjoyed wide use as a fertilizer because of its high nitrogen content and the ready availability of the nitrogen. Its pronounced tendency to cake, or set, under conditions of storage and shipping has provoked many attempts to overcome this caking tendency including treatments with water-proofing or moisture repelling conditioning agents such as resins, soaps, waxes, glycerine, urea, petrolatum, rosin, paraffin, kaolin, kieselguhr, plaster of Paris, soapstone, and the like. However the treatment of ammonium nitrate with these agents has resulted in only partial protection against caking or setting. The disasters at Oppau, Germany, in 1921 and at Texas City, in the United States in 1947, are believed to have been caused by the detonation of ammonium nitrate which was coated with a prohibitively large amount (about 1 weight percent) of certain organic materials and as a result, the most widely used coating agents today are such inorganic materials as clay and diatomaceous earths. These latter conditioning agents, though satisfactory in many respects, are relatively expensive and must be used in relatively large amounts.

Accordingly, an object of this invention is to provide an improved fertilizer, such as ammonium nitrate. Another object is to provide a method for producing a free-flowing fertilizer, such as ammonium nitrate, which exhibits little or no tendency to cake on standing. Another object is to provide a cake-resistant fertilizer by conditioning the same with a novel conditioning agent. A further object is to provide a method for lessening the tendency of granular or prilled ammonium nitrate to cake during storage and shipping. A still further object is to provide an ammonium nitrate-containing fertilizer which may be readily distributed in the field. Other objects and advantages of this invention will become apparent to those skilled in the art from the accompanying discussion and in the appended claims.

Now according to this invention it has been found that solid fertilizers, such as granular or prilled ammonium nitrate, which normally tend to cake during storage and shipping, can be rendered substantially free-flowing by treating or conditioning the fertilizer with a novel conditioning agent comprising a combination of certain sodium phosphates and alkyl aryl sulfonates.

By convention all phosphates can be represented stoichiometrically as combinations of oxides. Thus, $Na_4P_4O_{12}$ can be written as $2Na_2O:2P_2O_5$. The ratio of the cationic oxide, $Na_2O$, to the anionic oxide, $P_2O_5$, determines the type of phosphate. If the mole ratio of $Na_2O/P_2O_5$ is exactly unity, the substance is a metaphosphate; if the ratio lies between 1 and 2, the substance is a polyphosphate; and if the ratio is exactly 2, the substance is a pyrophosphate. These phosphates can exist as simple compounds or can exist in the form of mixtures of phosphates, such as a mixture of sodium hexametaphosphate and sodium tetraphosphate, with a mole ratio, for example, of 1.2. Furthermore, these phosphates can exist in a crystalline state or in an amorphous state, the latter type of phosphate commonly referred to as glasses.

The sodium phosphates applicable as a component of the novel conditioning materials of this invention are selected from the group consisting of crystalline sodium metaphosphates, crystalline sodium pyrophosphates, crystalline sodium polyphosphates, glassy sodium polyphosphates, and mixtures thereof. The mole ratio of $Na_2O/P_2O_5$ of these phosphates falls in the range of 1.0 to 2.0.

Representative sodium phosphates useful in the practice of this invention include crystalline metaphosphates, such as sodium trimetaphosphate and sodium tetrametaphosphate; crystalline tetrasodium pyrophosphate; crystalline pentasodium tripolyphosphate; glassy polyphosphates such as sodium eicosaphosphate, sodium decaphosphate, sodium heptaphosphate, sodium hexaphosphate, sodium pentaphosphate, sodium tetraphosphate, and sodium triphosphate; and mixtures thereof. The glassy and crystalline polyphosphates preferably used in the practice of this invention have a mole ratio $Na_2O/P_2O_5$ in the range between about 1.15 and 1.25. Commercially available sodium phosphates include Sodium Polyphos with a mole ratio $Na_2O/P_2O_5$ of about 1.2, and Cyclophos, crystalline sodium tetrametaphosphate with a mole ratio $Na_2/P_2O_5$ of 1:1.

The alkyl aryl sulfonates employed as the other essential component of the novel conditioning agents of this invention are alkali metal salts of alkyl aryl sulfonic acids which have a total of 8 to 30 carbon atoms per molecule with preferably at least 1–4 carbon atoms in the aliphatic hydrocarbon chain. The aryl portion of these compounds can be either a benzene or naphthalene nucleous. These sulfonates can be prepared by the well known procedure of sulfonating the corresponding alkyl aromatic compound and forming the alkali metal salt of the resulting sulfonic acid.

Representative alkyl aryl sulfonates useful in the practice of this invention include the sodium salt of 2-n-butylbenzenesulfonic acid, the sodium salt of 3-tert-dodecylbenzenesulfonic acid, the potassium salt of 4-n-eicosylbenzenesulfonic acid, the lithium salt of 4-tetracosylbenzenesulfonic acid; the disodium salt of 6-n-decylbenzene-p-disulfonic acid; the trirubidium salt of 5-tert-hexadecylbenzene-2,4,6-trisulfonic acid; the sodium salt of methylnaphthalene sulfonic acid, such as the sodium salts of 1-methylnaphthalene-2-sulfonic acid, 1-methylnaphthalene-4-sulfonic acid, and mixtures thereof; the sodium salt of 6-n-eicosylnaphthalene-1-sulfonic acid; the trisodium salt of 6,7,8-triethylnaphthalene-1,2,3-trisulfonic acid; the dicesium salt of 2,5-dimethylbenzene 1,3-disulfonic acid; the disodium salt of 4,6-di-n-decylnaphthalene 1,8-disulfonic acid; the potassium salt of 7-tert-dodecylnaphthalene-2-sulfonic acid; the sodium salt of 2,5-dimethylbenzenesulfonic acid; and mixtures thereof. A particularly useful commercially available class of alkyl aryl sulfonates are alkyl naphthalene sulfonates marketed as Udets, such as Udet F.

While the amounts of the sodium phosphates and alkyl aryl sulfonates to be used according to this invention will depend upon several variables, such as the use to be made of the fertilizer, the conditions under which the fertilizer will be stored, the amount of cake-resistance desired, the presence of other fertilizer material, etc., best results are obtained when the amount of the sodium phosphate is in the range between about 0.1 and 2.0 weight percent, based on the fertilizer, and the amount of the alkyl aryl sulfonate is in the range between about 0.01 and 0.2 weight percent on the same basis. The sodium phosphate is preferably powdered to a particle size sufficiently fine to pass substantially all of the material through 150 mesh standard screen, preferably 325 mesh standard screen or higher. The phosphate can be applied in its dry powdered form or in an aqueous solution. The alkyl aryl sulfonate can also be applied in its dry form having a similar size, or can be applied in the form of a solution using solvents such as ethyl alcohol, acetone, diethyl ether, water, and the like.

The combination conditioning agent of this invention can be applied to the fertilizer in any manner which will fulfill the objects of this invention. The combination conditioning agent can be sprayed on granular or prilled fertilizer in the form of a solution, it can be applied by spraying on chopped or granulated fertilizer, and it can be admixed with molten fertilizer which is subsequently solidified and prilled or granulated. A still further method of application which can be employed is the addition of the sodium phosphate to the molten fertilizer, after which the melt is prilled, chopped or granulated, and then a solution of the alkyl aryl sulfonate, such as an aqueous solution, can then be sprayed on the solid fertilizer material. These different methods of application of the combination conditioning agent are generically referred to in this application and in the appended claims as methods of "conditioning."

It is also within the scope of this invention to utilize known inorganic conditioning or anti-caking agents in combination with the two-component conditioning agent of this invention. For example, the combination conditioning agent of this invention can be applied to the fertilizer by any of the aforementioned methods of application, after which the treated fertilizer can be further conditioned with clay, diatomaceous earth (such as Dicalite), and the like, for example, by tumbling the latter with the fertilizer conditioned with the combination agent of this invention.

The novel conditioning agents of this invention are effective in reducing or preventing the treated fertilizer from caking during storage, particularly during storage under fluctuating conditions of ambient temperature and humidity. The conditioned fertilizers have substantially free-flowing properties which contribute to their distribution in the field. Furthermore, the addition of the conditioned fertilizers to soil provides a means whereby plants can assimilate phosphates, which increases the productive effect of the fertilizer.

Although this invention is of particular value in the production of non-caking ammonium nitrate, or ammonium nitrate-containing fertilizers, it is not limited thereto but may generally be applied in the production of any commercially prepared fertilizer, whether simple or mixed, which normally tends to cake on standing; such as sodium, potassium, and calcium nitrates, urea, monoammonium sulfate, ammonium sulfate, and the like.

The following examples further illustrate this invention and the mertits thereof.

EXAMPLES

Ammonium nitrate fertilizer samples were melted and predetermined amounts of a sodium phosphate glass and an alkyl aryl sulfonate were added to the melt samples. The sodium phosphate employed was a glass having an empirical formula $Na_{12}P_{10}O_{31}$ which contained 63.5 weight percent of $P_2O_5$ with a mole composition $Na_2O/P_2O_5$ of 1.2:1, this sodium phosphate being marketed as Sodium Polyphos. The alkyl aryl sulfonate employed is marketed as Udet F. Udet F was analyzed and found to contain the following on a weight percent basis: carbon 53.3, hydrogen 4.9, sulfur 13.1, sodium 7.4, and oxygen (by difference) 21.3; the ash content determined by heating at 1000° F. for 16 hours was found to be 27.7 weight percent. This analysis corresponds to that of the sodium salt of methylnaphthalene-sulfonic acid. These conditioning materials were first dissolved in a minimum amount of water and then added as a solution to the melt samples. After the addition of the combination conditioning agent, the treated molten ammonium nitrate fertilizer was then solidified by cooling, after which the solid ammonium nitrate was chopped into fairly fine particle size, and screened to provide an 8–12 mesh (Tyler) fraction. The moisture content of each sample was determined after drying the samples in an oven at 110° C. The fertilizer material was then tested for caking by a test hereinafter referred to as the "cake test." In this test 65 gram portions of the conditioned fertilizer were poured into polyethylene cylinders fabricated from two layers of 1½ mil wall thickness polyethylene. The inside diameters of the cylinders were 1⅞ inches and the ends of the cylinders were plugged with Lucite blocks ½ inch thick and 1⅛ inches in diameter. The blocks were held in place in the cylinders by means of cellophane tape. The cylinders were then placed in a brass mold containing 3 holes each, 4 inches deep and 2 inches in diameter. A bellows was then attached to the top of the mold so as to supply 24 p.s.i. air pressure to the fertilizer particles in the cylinders. The entire arrangement was then placed in an oven and maintained at 140° F. for 18 hours. The mold was then removed from the oven and opened, and the fertilizer cakes which had been formed were removed from the cylinders. The cross-sectional area of each fertilizer cake was 2.75 square inches. The samples of the conditioned ammonium nitrate fertilizer had hardened in the form of cakes as a result of the pressure and elevated temperature to such an extent that a certain pressure was necessary to break or crush the cakes. The cakes were then tested to breaking or crushing in a Carver commercial press and the total pounds of pressure required to break each cake was recorded. This cake-breaking procedure is a modification of the test procedure described in Ind. & Eng. Chem. 33, 121–127 (1941). The results of these tests are tabulated in Table I. At the time each run was made, a control run containing no conditioning agent was also made. A similar run was made in which ammonium nitrate of an identical moisture content had been coated by tumbling with 3.5 weight percent Dicalite, a commercial anti-caking agent of the diatomaceous earth type. The percent relative effectiveness of each sample was determined according to the following formula:

Percent relative efficiency
$$= (100) \frac{\text{crushing strength of cake containing 3.5 weight percent Dicalite}}{\text{crushing strength of test cake}}$$

Table I

| Run Number | Conditioning agent, wt. percent | | Moisture in nitrate sample, wt. percent | Crushing Strength, lb. | | Untreated Cake | Relative Effectiveness, percent |
|---|---|---|---|---|---|---|---|
| | Phosphate a | Alkarylsulfonate | | Test Cake | Comparison cake treated with Dicalite | | |
| 1 | 0 | 0.1 | 0.24 | 330 | 230 | 510 | 70 |
| 2 | 0 | 0.2 | 0.24 | 300 | 230 | 510 | 77 |
| 3 | 0 | 0.3 | 0.21 | 330 | 215 | 435 | 65 |
| 4 | 0 | 0.5 | 0.25 | 285 | 235 | 545 | 83 |
| 5 | 0.1 | 0 | 0.24 | 300 | 230 | 510 | 77 |
| 6 | b 0.5 | 0 | 0.17 | 235 | 200 | 370 | 85 |
| 7 | 0.5 | 0 | 0.23 | 305 | 227 | 486 | 74 |
| 8 | 0.6 | 0 | 0.24 | 300 | 230 | 510 | 77 |
| 9 | 1.0 | 0 | 0.28 | 285 | 255 | 650 | 90 |
| 10 | 1.0 | 0 | 0.28 | 340 | 255 | 650 | 75 |
| 11 | 0.1 | 0.1 | 0.20 | 215 | 212 | 415 | 99 |
| 12 | 0.3 | 0.1 | 0.33 | 175 | 292 | 785 | 167 |
| 13 | 0.3 | 0.1 | 0.24 | 150 | 230 | 510 | 153 |
| 14 | 0.3 | 0.1 | 0.23 | 220 | 228 | 485 | 104 |
| 15 | 0.3 | 0.1 | 0.18 | 130 | 202 | 385 | 155 |
| 16 | b 0.3 | 0.1 | 0.25 | 150 | 235 | 545 | 156 |
| 17 | c 0.5 | 0.1 | 0.21 | 170 | 215 | 435 | 127 |
| 18 | 0.5 | 0.1 | 0.27 | 185 | 250 | 615 | 135 |
| 19 | d 0.5 | 0.1 | 0.22 | 395 | 212 | 415 | 54 |
| 20 e | 0.5 | 0.1 | 0.22 | 110 | 220 | 460 | 200 |
| 21 | 1.0 | 0.1 | 0.24 | 160 | 230 | 510 | 144 | a Except as otherwise indicated, the phosphate employed was Sodium Polyphos.
b The phosphate employed in these runs was crystalline tetrasodium pyrophosphate.
c The phosphate employed in this run was Cyclophos (crystalline sodium tetrametaphosphate).
d The phosphate employed in this run was pure glassy sodium hexametaphosphate.
e In this run, the phosphate was put in the $NH_4NO_3$ melt, the sulfonate sprayed onto 2 wt. % Dicalite, and the so treated Dicalite then tumbled onto the melt.

The above data of Table I show that in runs 11–18 and 19–21 wherein the combination conditioning agents of this invention were employed the conditioned fertilizer samples exhibited less tendency to cake than those samples where only a phosphate or an alkyl aryl sulfonate was employed as the sole condition agent. In addition, run 19 above indicates that a glassy metaphosphate did not markedly reduce caking. The above data indicated that when the two-component conditioning agent of this invention is employed, the results are synergistic, although the data also indicate that the single components themselves are not additive. In summary, it can be seen from the above data that it is surprising to find that the two-component conditioning agent of this invention provides such excellent reduction in the caking tendency of fertilizer.

While the invention has been described in connection with present, preferred embodiments thereof, it is to be understood that this description and the examples herein are illustrative only and it is not intended to limit the invention thereto, and various modifications within the spirit and scope of this invention will be apparent to one skilled in the art upon study of this disclosure.

I claim:
1. A method for improving the storage stability of granular ammonium nitrate, which comprises coating said granular ammonium nitrate with an agent comprising about 0.1 to 2 weight percent of a sodium phosphate and about 0.01 to 0.2 weight percent of an alkyl aryl sulfonate having 8 to 30 carbon atoms per molecule, said weight percents based on said ammonium nitrate.

2. The method according to claim 1 wherein said sodium phosphate is selected from the group consisting of crystalline sodium metaphosphates, crystalline sodium pyrophosphates, and crystalline and glassy sodium polyphosphates, and wherein said alkyl aryl sulfonate is an alkali metal salt of an alkyl aryl sulfonic acid having a total of 8 to 30 carbon atoms per molecule with at least 1–4 of these carbon atoms in the aliphatic hydrocarbon chain, and where the aryl portion of the molecule is selected from the group consisting of benzene and naphthalene groups.

3. The method according to claim 2 wherein said alkyl aryl sulfonate is the sodium salt of an alkyl benzene sulfonic acid.

4. The method according to claim 2 wherein said alkyl aryl sulfonate is the sodium salt of an alkyl naphthalene sulfonic acid.

5. The method according to claim 2 wherein said sodium phosphate has a mole ratio of $Na_2O/P_2O_5$ in the range of about 1.0 and 2.0.

6. The method according to claim 2 wherein said sodium phosphate is sodium trimetaphosphate, and said sulfonate is the sodium salt of an alkyl aryl sulfonic acid.

7. The method according to claim 2 wherein said sodium phosphate is tetrasodium pyrophosphate, and said sulfonate is the sodium salt of an alkyl naphthalene sulfonic acid.

8. The method according to claim 2 wherein said sodium phosphate has an empirical formula $Na_{12}P_{10}O_{31}$ with a mole ratio of $Na_2O/P_2O_5$ of about 1.2, and said sulfonate is the sodium salt of methyl naphthalene sulfonic acid.

9. As a new article of manufacture, ammonium nitrate granules coated with an agent comprising about 0.1 to 2 weight percent of a sodium phosphate and about 0.01 to 0.2 weight percent of an alkyl aryl sulfonate having a total of 8 to 30 carbon atoms per molecule, said weight percents based on said ammonuim nitrate granules.

References Cited in the file of this patent
UNITED STATES PATENTS

| | | |
|---|---|---|
| 1,978,040 | Daitz | Oct. 23, 1934 |
| 2,284,002 | Lontz | May 26, 1942 |
| 2,314,091 | Jones | Mar. 16, 1943 |
| 2,399,987 | Cordie et al. | May 7, 1946 |
| 2,614,917 | Zuckel et al. | Oct. 21, 1952 |
| 2,802,728 | Jaquier | Aug. 13, 1957 |
| 2,905,532 | Thompson | Sept. 22, 1959 |